United States Patent [19]

Kirschner

[11] 4,254,985

[45] Mar. 10, 1981

[54] DAMPING RING FOR ROTATING ASSEMBLIES

[75] Inventor: Frank Kirschner, East Hills, N.Y.

[73] Assignee: The Soundcoat Company, Inc., Brooklyn, N.Y.

[21] Appl. No.: 23,319

[22] Filed: Mar. 23, 1979

[51] Int. Cl.³ .................... B60D 7/04; B60D 17/00; F16H 55/14

[52] U.S. Cl. ................................. 295/7; 295/6; 74/443

[58] Field of Search ............ 295/6, 7, 11, 31, 33, 295/34; 74/432, 443

[56] References Cited

U.S. PATENT DOCUMENTS

| 1,136,839 | 4/1915 | Seidel | 295/7 |
|---|---|---|---|
| 1,813,820 | 7/1931 | Ross | 295/7 |
| 2,267,311 | 12/1941 | Smith | 295/7 |
| 2,605,132 | 7/1952 | Watter | 295/7 |
| 3,377,097 | 4/1968 | Swanson | 295/6 |
| 3,843,188 | 10/1974 | Kirschner | 295/6 |

OTHER PUBLICATIONS

Materials for Constrained-Layer Damping, Published by the Soundcoat Company, Inc., Brooklyn, New York.
New Developments in the Control of Railroad Wheel Screech Noise, Oct. 4-6, 1972, pp. 225-230, Internoise 72 Proceedings.
New Materials for Vibration Damping Control, Aug. 27-29, 1975, Inter-Noise 1975.

Primary Examiner—Richard A. Bertsch
Attorney, Agent, or Firm—Robert Scobey

[57] ABSTRACT

A vibration damping assembly for a wheel or the like that undergoes rotation is achieved by providing an annular groove in a surface of the wheel which is coaxial with the axis of the wheel. A viscoelastic damping material subject to shear deformation during rotation of the wheel is positioned within the groove against the surface of the groove, and an annular metal ring is positioned in the groove against the viscoelastic damping material with the damping material sandwiched between the ring and wheel.

6 Claims, 3 Drawing Figures

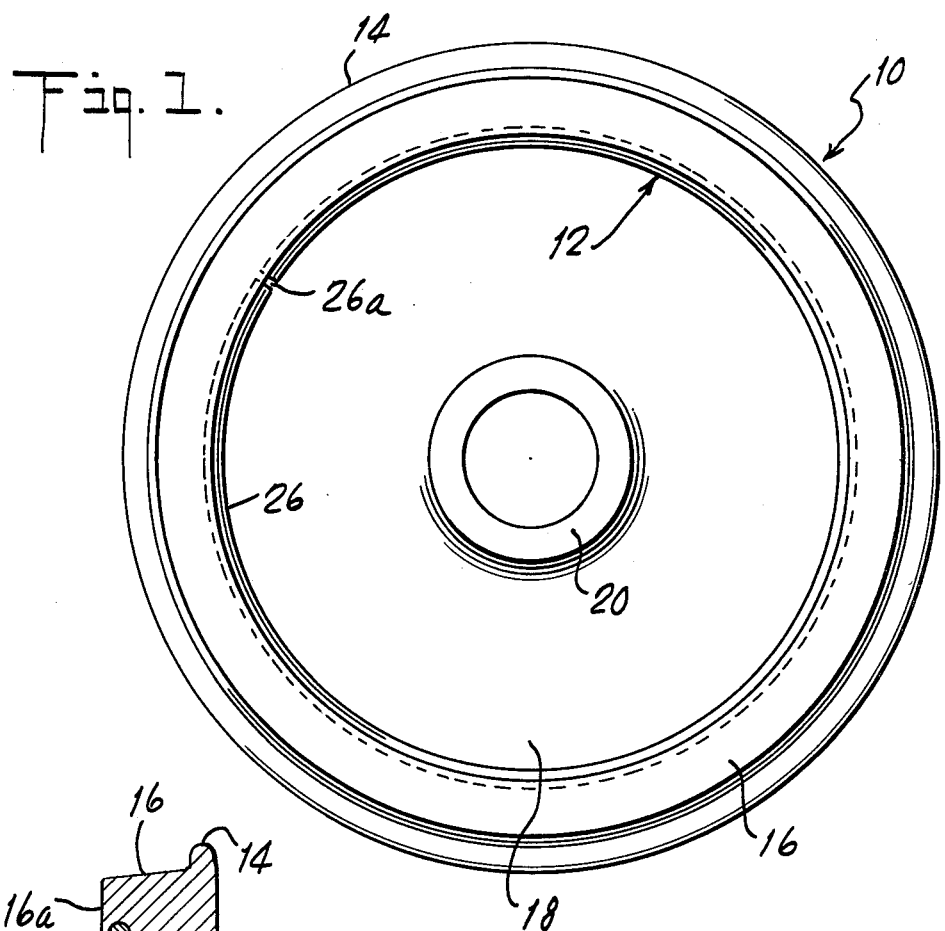
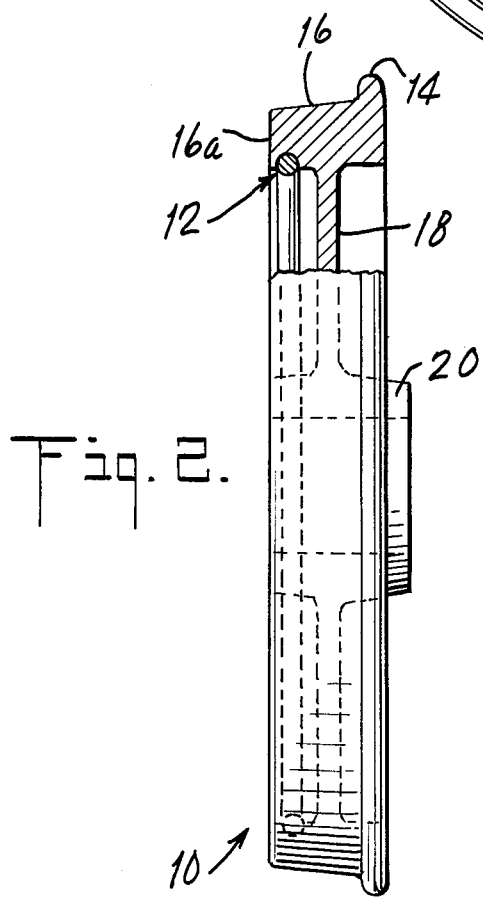
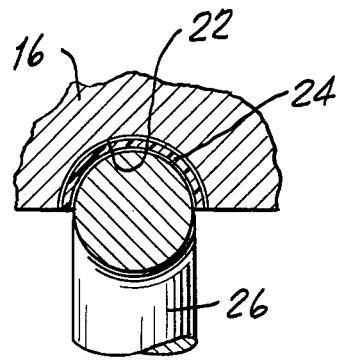

DAMPING RING FOR ROTATING ASSEMBLIES

BACKGROUND AND BRIEF DESCRIPTION OF THE INVENTION

This invention relates to the damping of vibration, and more particularly to the damping of vibration in rotating devices. The invention has particular application to the attenuation of screech noise from railraod wheels.

Assemblies for damping vibration in rotating devices are known. Many involve the use of relatively heavy damping assemblies, which is undesirable from the standpoint of adding an additional load to the rotating device as well as safety. In the present invention, a lightweight damping assembly is provided.

One example of prior damping techniques is illustrated by Smith, U.S. Pat. No. 2,267,311 issued Dec. 23, 1941. That patent discloses use of a vibration-dampening member which is die-stamped from a sheet of steel and has the general configuration of the wheel to which it is attached. The present invention avoids the need to die-stamp sheet metal.

Another example of a prior damping assembly is Watter, U.S. Pat. No. 2,605,132 issued July 29, 1952. In that patent, two metal rings with a thin annulus of rubber vulcanized thereto are employed as a damping assembly which is force fitted onto a wheel. The force fitting requires a cooling of the ring by packing it in dry ice, e.g., to cause the ring to shrink to a diameter permitting it to be installed on the wheel, following which the ring expands and is locked to the wheel as it returns to normal temperature. In the present invention, in contrast, vulcanizing of rubber and temperature treatment of a damping ring assembly for fitting that assembly to a wheel are not required.

The present invention involves a vibration damping assembly for a wheel or the like that includes an annular groove in a surface of the wheel and coaxial with the wheel axis. A viscoelastic damping material subject to shear deformation during rotation of the wheel is positioned within the groove against the surface of the groove, and an annular metal ring is positioned in the groove against the viscoelastic damping material, with the damping material sandwiched between the ring and wheel. Preferably the viscoelastic damping material is adhesively secured to both the wheel and the ring for enhanced damping, although it is possible to omit the adhesive if desired. It is believed that enhanced vibration damping will be achieved through the use of adhesive, such as a flexible epoxy adhesive. Also, it is preferable to position the damping assembly on the wheel so that it does not extend outwardly beyond the plane defining the edge of the wheel. In this fashion, particularly with a railroad wheel or other rotating wheel that may come in contact with external mechanisms, the damping assembly is protected and will not be subjected to external forces that might damage it.

The invention will be more completely understood by reference to the following detailed description.

BRIEF DESCRIPTION OF THE DRAWING

FIG. 1 is a plan view of a railroad wheel embodying the invention.

FIG. 2 is a side view of the railroad wheel of FIG. 1, partly in section.

FIG. 3 is an enlarged view of a portion of FIG. 2.

DETAILED DESCRIPTION

Referring to FIG. 1, a railroad wheel 10 is shown that has affixed thereto a vibration damping assembly 12 in accordance with the invention. The wheel includes a flange portion 14, a rim portion 16, a web portion 18 and a hub portion 20. The vibration damping assembly 12 is positioned in the rim portion 16 of the wheel, as shown in FIGS. 2 and 3 in detail.

An annular groove 22 is formed in the rim portion 16 of the wheel, typically by machining, and preferably in an inside surface of the wheel. The groove 22 is generally in a plane spaced from the plane defined by the outer edge 16a of the wheel. By so positioning groove 22 in the wheel, possible damage to the vibration damping assembly 12 is avoided because the damping assembly is thereby positioned on an inside wheel surface.

A viscoelastic damping material 24 is positioned within the groove 22, and this is generally in thin sheet form within the groove. The viscoelastic damping material may be adhesively secured in place within the groove, such as by use of a flexible epoxy adhesive. Next, an annular metal ring 26, preferably of spring steel, is "snapped" into place in the groove, positioned against the viscoelastic damping material 24. Preferably, the ring 26 is adhesively secured to the viscoelastic damping material, such as by use of a flexible epoxy adhesive. As shown in FIG. 1, the ends of the ring 26 are generally spaced-apart from each other, as shown at 26a. If desired, the ends of the ring may be welded together.

In the railroad wheel and damping assembly just described, the wheel itself is typically about 28 inches in diameter, and approximately 500 pounds in weight. The damping ring 26 is preferably of tempered, spring steel, and may be of the same steel of the railroad wheel 10. The ring may be one-half inch in cross-sectional diameter for a wheel as just specified. The viscoelastic damping material may be any suitable damping material which is subject to shear deformation during rotation of the wheel. A suitable product is manufactured by the Soundcoat Company, Inc., of 175 Pearl Street, Brooklyn, New York 11201, United States of America, under product designation DYAD. Bulletin 701 published by the Soundcoat Company, Inc. and entitled "Soundcoat Product Data Sheet, DYAD For Use In Thick Plate Vibration Damping" describes DYAD material and applications. Further Soundcoat Company publications describing viscoelastic damping material applications are as follows:

"Materials for Constrained-Layer Damping"
"New Materials for Vibration Damping Control" by F. Kirschner, and published in Inter-Noise 75.
"New Developments In The Control of Railroad Wheel Screech Noise" by Francis Kirschner, and published in Inter-Noise 72 Proceedings.

The viscoelastic material is, as noted above, applied in sheet form, and is typically 50 mils in thickness for a railroad wheel of the type specified above. As noted, this viscoelastic damping material is preferably adhesively secured to the wheel as well as to the damping ring 26. A suitable adhesive is a flexible epoxy adhesive sold by the Soundcoat Company, Inc., under its product designation "Soundcoat B-Flex Epoxy Adhesive". It is believed that vibration damping will be enhanced if adhesive is used, as noted, although adhesive may be dispensed with if desired. Thus, it is possible to omit the adhesive bond between the viscoelastic damping layer 24 and wheel 10 and/or the adhesive bond between the viscoelastic damping layer and the ring 26.

The ring 26, as noted, is "snapped" in place. The cross-sectional diameter of the ring 26 is slightly less than that of the groove 22 in the wheel. The diameter of the ring annulus is such as to permit the "snapping" into place of the ring and its positioning in place under spring tension. While it is not believed necessary to weld the ring in place, spot welding of the ends of the ring, as at 26a in FIG. 1, may be completed as noted above. In addition, it is possible to spot weld the ring 26 to various portions of the wheel 10 around the periphery of the ring, if desired. However, it is presently believed desirable not to weld the ring in place.

A damping assembly 12 as described above generally might weigh no more than about 4¼ pounds (the weight of the steel ring 26). This compares with a wheel of about 500 pounds in weight, and hence the damping assembly is virtually a negligible weight addition to the wheel (less than 1% by weight).

Although damping rings such as the ring 26 have been employed before, they have been used alone in a system in which they are snapped into place in a railroad wheel. Such a system is strictly a friction type system, and the vibration damping characteristics of such a system have been non-uniform because of the lubrication taking place between ring and wheel as caused by oil and grease between ring and wheel as well as rust between the two, which acts as a lubricant. In the present invention, by utilizing the viscoelastic damping material between the ring and wheel, a threelayer damping system is provided, consisting of wheel, viscoelastic damping material, and spring metal ring. Such a damping assembly is greatly preferable to the friction type ring/wheel damping assemblies used beforehand because of the added benefit of viscoelastic damping and an avoidance of friction damping. The system is economical and safe, and is not subject to being easily damaged by virtue of the positioning of the damping assembly in an inside surface of the wheel. Such a viscoelastic damping system, when optimized, may provide between about 20 and 26 decibels of attenuation, as compared with only about 5 to 10 decibels of attenuation in a friction damping system as noted above.

A presently preferred embodiment of the invention has been described in detail above. The damping system disclosed may be optimized in terms of frequency, temperature, and geometrical configuration. The publications noted above are of assistance in optimizing the damping treatment in any particular application.

In view of the above, the invention should be taken to be defined by the following claims.

I claim:

1. A vibration damping assembly for a wheel or the like that undergoes rotation comprising an annular groove in a surface of said wheel and coaxial with the axis of said wheel, a viscoelastic damping material subject to shear deformation during rotation of said wheel and positioned within said groove against the surface of said groove, and an annular metal ring positioned in said groove against said viscoelastic damping material with said damping material sandwiched between said ring and said wheel.

2. A vibration damping assembly according to claim 1, in which said viscoelastic damping material is adhesively secured to said wheel.

3. A vibration damping assembly according to claim 1, in which said viscoelastic damping material is adhesively secured to said annular ring.

4. A vibration damping assembly according to claim 1, in which said viscoelastic damping material is adhesively secured to said wheel and to said annular ring.

5. A vibration damping assembly according to claim 4, in which said viscoelastic damping material is adhesively secured to said wheel and to said annular ring by a flexible epoxy adhesive.

6. A vibration damping assembly according to claim 5, in which said annular groove is positioned in an inside surface of said wheel in a plane spaced from the plane defined by an outer edge of said wheel, said annular ring is of spring steel, and the cross section of said annular ring is generally circular.

* * * * *